United States Patent Office 2,879,286
Patented Mar. 24, 1959

2,879,286

PHOSPHOROAMIDOTHIOATES

Henry Tolkmith and Kenneth C. Kauer, Midland, Mich., assignors to The Dow Chemical Company, Midland, Mich., a corporation of Delaware No Drawing. Application April 4, 1956
Serial No. 575,960

6 Claims. (Cl. 260—461)

This invention is concerned with the phosphoroamidothioates having the formula

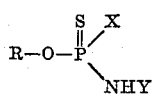

In this and succeeding formulas, R represents a chlorophenyl radical, X represents methoxy, ethoxy or methylamino and Y represents phenyl, benzyl, chlorobenzyl or chlorophenyl. These new compounds are crystalline solids or viscous liquids somewhat soluble in organic solvents and of very low solubility in water. They have been found to be active as parasiticides and are adapted to be employed as active toxic constituents of compositions for the control of mites and insect organisms such as southern army worms and flies.

The new compounds may be prepared by several methods. In one method the compounds may be produced by reacting an aryl amine compound of the formula

HNHY with a phosphorochloridothioate of the formula

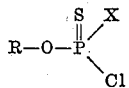

The reaction is carried out in the presence of an inert organic solvent such as benzene, toluene, or acetone. The reaction takes place smoothly at the temperature range of from 0° to 80° C. with the formation of the desired product and amine hydrochloride of reaction. Good results are obtained when employing at least two molecular proportions of the aryl amine reagent with each molecular proportion of the phosphorochloridothioate reagent.

In carrying out the reaction the aryl amine reagent is added portionwise to the phosphorochloridothioate reagent dispersed in the reaction solvent. This operation is carried out with stirring and at a temperature of from 0° to 80° C. Upon completion of the reaction, the reaction mixture may be washed with water and any reaction solvent removed by evaporation under reduced pressure to obtain the desired product as a residue.

In an alternative procedure, the O-chlorophenyl O-alkyl phosphoroamidothioate compounds of the present invention may be prepared by reacting an alkali metal methylate or alkali metal ethylate with an O-halophenyl phosphoroamidochloridothioate of the formula

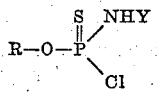

The reaction is somewhat exothermic and takes place smoothly at temperatures of from 20° to 90° C. The temperature may be controlled by regulating the rate of contacting the reagents and by external cooling. Good results are obtained when employing substantially equimolecular proportions of the reagents. The reaction is carried out in a solvent such as benzene or toluene and conveniently in the alcohol employed in the preparation of the alcoholate. In carrying out the reaction, the alcoholate, preferably as the sodium salt, is added portionwise at the reaction temperature to the O-halophenyl phosphoroamidochloridothioate reagent dispersed in the reaction solvent. Upon completion of the reaction, any alcohol solvent may be removed by evaporation, and the residue dispersed in a water immiscible solvent such as benzene and thereafter washed with water. The solvent is then removed by evaporation or fractional distillation under reduced pressure to obtain the desired product as a residue.

In another procedure, the O-chlorophenyl phosphorodiamidothioates of the present invention may be prepared by reacting at least two molecular proportions of methyl amine with one molecular proportion of an O-chlorophenyl phosphoroamidochloridothioate of the formula

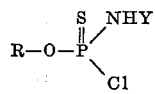

The conditions of reaction, contacting of the reagents and methods of separation are all as previously described for the reaction between the aryl amine compounds and the phosphorochloridothioate reagents.

The following examples illustrate the invention but are not to be construed as limiting.

EXAMPLE 1

*O-(2,4,5-trichlorophenyl) O-methyl N-(3-chlorophenyl) phosphoroamidothioate*

A solution of 28.3 grams (0.22 mole) of 3-chloroaniline in 75 milliliters of benzene was added portionwise to an agitated solution of 36.2 grams (0.11 mole) of O-(2,4,5-trichlorophenyl) O-methyl phosphorochloridothioate in 300 milliliters of benzene. The addition was carried out over a period of one hour and at a temperature of from 35° to 80° C. Following the addition, the reaction mixture was heated at the boiling point and under reflux for six hours. The solvent was then removed by evaporation, and the residue dissolved in toluene and heated at the boiling temperature and under reflux for 2.5 hours to complete the reaction. The toluene was then removed by evaporation and the residue extracted with hot petroleum ether (boiling point 60°–70° C.). The extract was filtered and the solvent removed by evaporation to obtain an O-(2,4,5-trichlorophenyl) O-methyl N-(3-chlorophenyl) phosphoroamidothioate product as an orange colored liquid having a refractive index n/D of 1.6172 at 20° C.

EXAMPLE 2

*O-(2,4,5-trichlorophenyl) O-ethyl N-(3-chlorophenyl) phosphoroamidothioate*

A suspension of 8.5 grams (0.125 mole) of sodium ethylate in benzene was added portionwise with stirring to a solution of 53 grams (0.125 mole) of O-(2,4,5-trichlorophenyl) N-(3-chlorophenyl) phosphoroamidochloridothioate in 200 milliliters of benzene. The mixture was heated at the boiling point and under reflux for 1.5 hours. The reaction mixture was then cooled to room temperature, made slightly acid with dilute hydrochloric acid and washed with water. Upon evaporation of the benzene, there was obtained an O-(2,4,5-trichlorophenyl) O-ethyl N-(3-chlorophenyl) phosphoroamidothioate product as a dark brown liquid having a refractive index $n/D$ of 1.600 at 20° C.

EXAMPLE 3

O-(2,4,5-trichlorophenyl) N-methyl N'-(3-chlorophenyl) phosphorodiamidothioate

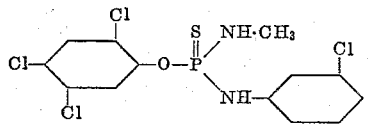

Eight grams (0.25 mole) of methylamine was added portionwise to a solution of 53 grams (0.125 mole) of O-(2,4,5-trichlorophenyl) N-(3-chlorophenyl) phosphoroamidochloridothioate in 200 milliliters of ether. The addition was carried out with stirring and at room temperature. Following the addition 200 milliliters of ether were added and the methylamine hydrochloride removed by filtration. The solvent was then removed from the filtrate by evaporation to obtain as a solid residue an O-(2,4,5-trichlorophenyl) N-methyl N'-(3-chlorophenyl) phosphoroamidothioate product. This product was recrystallized from boiling cyclohexane and found to melt at 132°–133° C.

EXAMPLE 4

O-(2,4,5-trichlorophenyl) O-methyl N-benzyl phosphoroamidothioate

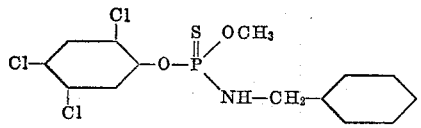

Sodium (2.3 grams, 0.1 mole) was dissolved in 200 milliliters of anhydrous methanol to prepare a methanol solution containing 5.4 grams (0.1 mole) of sodium methylate. The sodium methylate solution was added portionwise with stirring to 40.1 grams (0.1 mole) of O-(2,4,5-trichlorophenyl) N-benzyl phosphoroamidochloridothioate in 400 milliliters of anhydrous methanol. The addition was carried out over a period of one hour and at a temperature of from 25° to 31° C. Following the addition, the reaction mixture was heated and additional hour at 60° C. to complete the reaction. The greater portion of the methanol was removed under vacuum and 700 milliliters of benzene added to the residue. The sodium chloride of reaction was then separated by filtration and the solvent evaporated from the filtrate to obtain an O-(2,4,5-trichlorophenyl) O-methyl N-benzyl phosphoroamidothioate product as a crystalline solid having a melting point of 48°–50° C.

EXAMPLE 5

O-(4-chlorophenyl) O-methyl N-benzyl phosphoroamidothioate

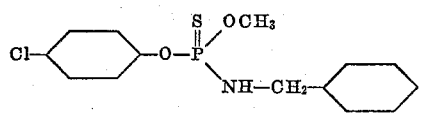

53.5 grams (0.5 mole) of benzylamine was added portionwise with stirring to a solution of 64 grams (0.25 mole) of O-(4-chlorophenyl) O-methyl phosphorochloridothioate in 250 milliliters of acetone. The addition was carried out over a period of one hour and at a temperature of from 5° to 15° C. After the addition, the reaction mixture was stirred for 30 minutes at room temperature to complete the reaction. The reaction mixture was then diluted with methylene chloride and washed with water. Upon evaporation of the methylene chloride there was obtained an O-(4-chlorophenyl) O-methyl N-benzyl phosphoroamidothioate product as an amber colored liquid having a chlorine content of 10.0 percent as compared to a theoretical content of 10.8 percent.

EXAMPLE 6

O-(3,4-dichlorophenyl) O-methyl N-benzyl phosphoroamidothioate

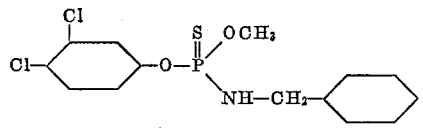

26.0 grams (0.26 mole) of benzylamine was added portionwise with stirring to a solution of 36 grams (0.13 mole) of O-(3,4-dichlorophenyl) O-methyl phosphorochloridothioate in 100 milliliters of acetone. The addition was carried out in 30 minutes and at a temperature of from 5° to 17° C. After the addition, the reaction mixture was stirred for 30 minutes to complete the reaction. The reaction mixture was then processed as described in Example 5 to obtain an O-(3,4-dichlorophenyl) O-methyl N-benzyl phosphoroamidothioate product as a yellow liquid having a density of 1.3268 at 25° C. and a refractive index $n/D$ of 1.5867 at 25° C.

In a similar manner, other phosphoroamidothioates may be prepared as follows:

O-(4-chlorophenyl) O-methyl N-(2-chlorophenyl) phosphoroamidothioate by the reaction of 2-chloroaniline and O-(4-chlorophenyl) O-methyl phosphorochloridothioate.

O-(3,4-dichlorophenyl) O-methyl N-phenyl phosphoroamidothioate by the reaction of aniline and O-(3,4-dichlorophenyl) O-methyl phosphorochloridothioate.

O-(2,4,5-trichlorophenyl) O-methyl N-(4-chlorophenyl) phosphoroamidothioate by the reaction of sodium methylate and O-(2,4,5-trichlorophenyl) N-(4-chlorophenyl) phosphoroamidochloridothioate.

O-(2-chlorophenyl) O-methyl N-(4-chlorobenzyl) phosphoroamidothioate by the reaction of 4-chlorobenzylamine and O-(2-chlorophenyl) O-methyl phosphorochloridothioate.

O-(2,4-dichlorophenyl) O-ethyl N-(2-chlorobenzyl) phosphoroamidothioate by the reaction of sodium ethylate and O-(2,4-dichlorophenyl) N-(2-chlorobenzyl) phosphoroamidochloridothioate.

O-(2,4,6-trichlorophenyl) O-methyl N-(3-chlorobenzyl) phosphoroamidothioate by the reaction of sodium methylate and O-(2,4,6-trichlorophenyl) N-(3-chlorobenzyl) phosphoroamidochloridothioate.

The new phosphoroamidothioates are effective as parasiticides and are adapted to be employed for the control of household and agricultural pests. For such use the products may be dispersed on a finely divided carrier and employed as dusts. The new products may also be employed in oils, as constituents in water emulsions or in water dispersions. In a representative operation 100 percent controls of southern army worms and houseflies have been obtained with aqueous compositions containing 500 parts by weight of O-(3,4-dichlorophenyl) O-methyl N-benzyl phosphoroamidothioate per million parts by weight of water.

The O-(chlorophenyl) O-methyl phosphorochloridothioates employed as starting materials may be prepared by the reaction at a temperature of from 20° to 90° C. of substantially equimolecular proportions of sodium methylate and an O-(chlorophenyl) phosphorodichloridothioate. In carrying out the reaction, a methanol solution of the alcoholate is added portionwise to the phosphorodichloridothioate reagent dispersed in methanol. Upon completion of the reaction, the reaction mixture is washed with water to obtain the desired product as a liquid residue.

The O-(chlorophenyl) N-aryl phosphoroamidochloridothioates employed as starting materials may be prepared by the reaction at a temperature of from 35° to 85° C. of two molecular proportions of aniline, benzylamine, chloroaniline, or chlorobenzylamine with one molecular proportion of an O-(chlorophenyl) phosphorodichloridothioate. In carrying out the reaction, a benzene solution of the aryl amine is added portionwise to the phosphorodichloridothioate reagent dissolved in benzene. This operation is carried out with stirring and at the reaction temperature. Upon completion of the reaction, the amine hydrochloride is filtered off and the benzene removed by evaporation to obtain the desired product as a residue.

We claim:
1. A phosphoroamidothioate having the formula

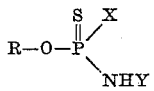

in which R represents a chlorophenyl radical, X represents a member of the group consisting of methoxy, ethoxy and methylamino and Y represents a member of the group consisting of phenyl, benzyl, chlorophenyl and chlorobenzyl.

2. O-(2,4,5-trichlorophenyl) O-methyl N-(3-chlorophenyl) phosphoroamidothioate.

3. O-(2,4,5-trichlorophenyl) O-ethyl N-(3-chlorophenyl) phosphoroamidothioate.

4. O-(2,4,5-trichlorophenyl) N-methyl N'-(3-chlorophenyl) phosphorodiamidothioate.

5. O-(3,4-dichlorophenyl) O-methyl N-benzyl phosphoroamidothioate.

6. O-(4-chlorophenyl) O-methyl N-benzyl phosphoroamidothioate.

References Cited in the file of this patent
UNITED STATES PATENTS
2,552,538   Drake et al. _____ May 15, 1951